(12) United States Patent
Weischedel

(10) Patent No.: US 9,791,301 B2
(45) Date of Patent: Oct. 17, 2017

(54) METHOD AND APPARATUS FOR WIRE ROPE DISTANCE MEASUREMENT

(71) Applicant: Herbert R. Weischedel, South Windsor, CT (US)

(72) Inventor: Herbert R. Weischedel, South Windsor, CT (US)

(73) Assignee: NDT Technologies, Inc., South Windsor, CT (US)

( * ) Notice: Subject to any disclaimer, the term of this patent is extended or adjusted under 35 U.S.C. 154(b) by 334 days.

(21) Appl. No.: 14/594,714

(22) Filed: Jan. 12, 2015

(65) Prior Publication Data

US 2015/0198463 A1    Jul. 16, 2015

Related U.S. Application Data

(60) Provisional application No. 61/925,866, filed on Jan. 10, 2014.

(51) Int. Cl.
| | |
|---|---|
| *G01N 27/60* | (2006.01) |
| *G01R 29/12* | (2006.01) |
| *G01D 5/244* | (2006.01) |
| *G01B 21/04* | (2006.01) |
| *G01B 7/02* | (2006.01) |
| *G01D 5/245* | (2006.01) |

(52) U.S. Cl.
CPC ......... *G01D 5/24452* (2013.01); *G01B 7/026* (2013.01); *G01B 21/042* (2013.01); *G01D 5/2451* (2013.01)

(58) Field of Classification Search
CPC .... G01D 5/4452; G01D 5/2451; G01B 7/026; G01B 21/042
USPC .................................. 324/207.25, 452, 457
See application file for complete search history.

(56) References Cited

U.S. PATENT DOCUMENTS 4,438,402 A * 3/1984 Cullen ................... G01B 7/044
324/452

* cited by examiner

*Primary Examiner* — Farhana Hoque
(74) *Attorney, Agent, or Firm* — McCormick, Paulding & Huber

(57) ABSTRACT

Measuring distance along a wire rope, by steps that include moving the wire rope across a sensor head; counting rotations of a rotary encoder driven by the moving wire rope; detecting a first distance marker crossing the sensor head at a first position of the wire rope; detecting a second distance marker crossing the sensor head at a second position of the wire rope; and establishing calibration parameters for producing a calibrated distance measurement corresponding to any output of the rotary encoder, based at least on correlating a known distance between the first and second distance markers to a counted number of pulses of the rotary encoder between the first and second positions of the wire rope.

20 Claims, 10 Drawing Sheets

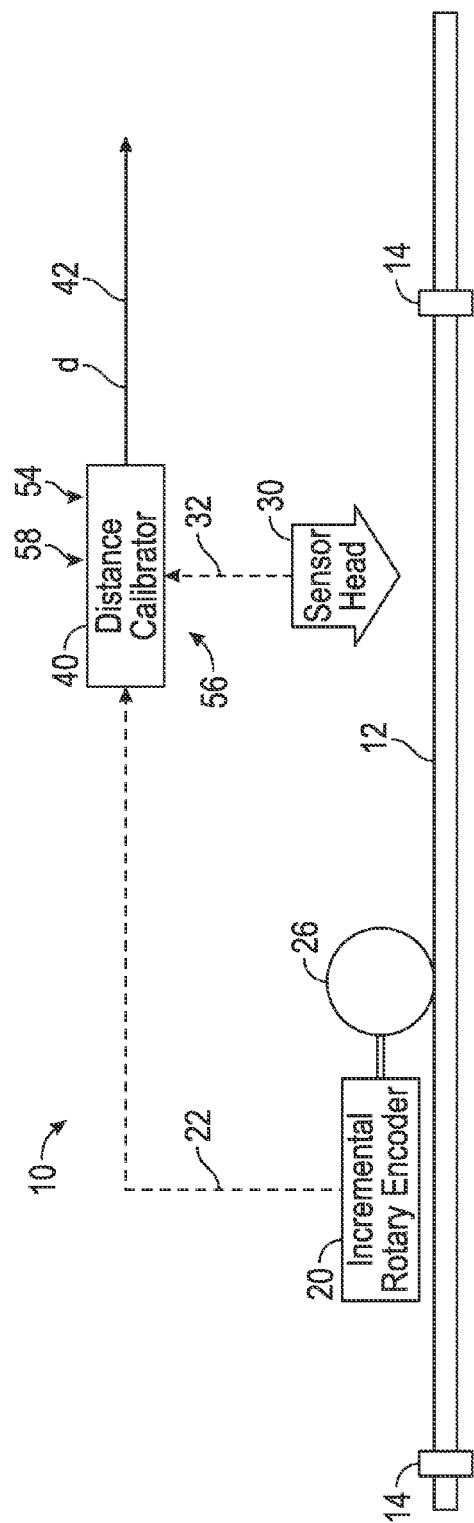
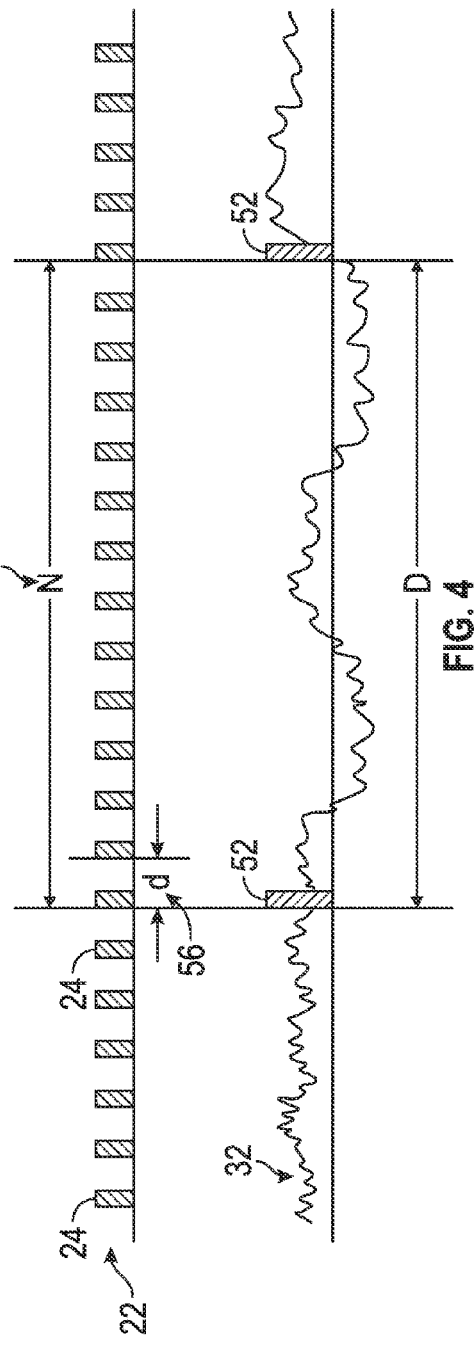
FIG. 3
FIG. 4

METHOD AND APPARATUS FOR WIRE ROPE DISTANCE MEASUREMENT

CROSS REFERENCE TO RELATED APPLICATION

This application is a non-provisional of U.S. patent application Ser. No. 61/925,866, "Distance Measurement for Wire Ropes," filed Jan. 10, 2014, hereby incorporated by reference in its entirety.

BACKGROUND

Technical Field

Embodiments of the invention relate generally to non-destructive evaluation (NDE) of wire ropes and cables during operation under load. Particular embodiments relate to measurements of distance along a loaded wire rope for purposes of NDE.

Discussion of Art

Many wire ropes for offshore applications, such as subsea construction ropes and mooring ropes, have large diameters (>100 mm) and lengths in excess of 2000 m. These ropes are expensive and frequently represent multimillion dollar investments, thus, they often are known as high value offshore ropes. For example, large mooring-lines for a wide variety of offshore structures can be classified as high value offshore ropes.

Other high value offshore ropes include winch-lines of pipeline-laying vessels. These ropes are utilized by offshore cranes for "Abandonment and Recovery" (A&R) operations of pipelines. A&R means to deposit a temporary pipeline termination on the seabed in order to take it up again later on. This process becomes necessary if temporary weather conditions do not allow a physical link between the vessel and the pipeline.

Especially the installation of subsea hardware requires extremely exact handling at high working loads. Operation on rough seas may result in the subsea hardware payload experiencing large oscillations, which can lead to instances of slack wire followed by large snap loads. Accordingly offshore cranes are equipped with so-called "Active Heave Compensation" (AHC) systems.

FIG. 1 shows an AHC system 170 that includes deflection sheaves 172, a storage winch 174, and a hydraulic piston 176 that thrusts and retracts a sheave 178 to accommodate slack and snap motions of a wire rope 12. Other types of AHC systems omit the hydraulic piston in favor of operating a storage winch in fast alternating cycles. An AHC system enables the offshore crane to compensate for heave motion so that the load connected to the crane hook can be lowered or lifted smoothly. Thus, heave compensation systems facilitate cranes, "Launch and Recovery Systems" (LARS) and other lifting equipment in operating in dynamic sea states. By installing a heave compensator, the dynamic payload motions can be mitigated and snap loads eliminated. Furthermore, a heave compensator enables the operator to keep the payload almost motionless with regard to the seabed or a fixed platform.

High-value ropes are safety critical. In contrast to smaller and less expensive ropes, they cannot be considered as disposable items. In spite of this situation, proper inspection methods for these ropes are only infrequently used. Most high value ropes are retired after predetermined service periods, irrespective of their actual condition. To protect the integrity of high-value ropes, the most sophisticated inspection and maintenance equipment and procedures available should be used. In particular, state-of-the-art magnetic rope NDE methods should be applied.

Realistically, a program of accurate and economically timed nondestructive inspections can extend the life of these ropes by several years, and possibly double their useful service life while, at the same time, maintaining safe operating conditions. Continuous monitoring will help with maintenance scheduling, so that advanced inspection and rope life evaluation methods can be used to plan rope retirement well in advance. For example, this would allow timely ordering a replacement rope.

A regime of regularly scheduled inspections will allow constant observation and data logging of the wire rope condition, which will help to establish maintenance schedules. This process will eliminate downtime for unexpected activities such as rope replacement, and it promises considerable savings by replacing the wire rope only when necessary and/or on planned maintenance schedules.

Regular and properly timed inspections can also serve as an effective preventive maintenance tool. To illustrate, here are some practical examples. Early detection of corrosion allows immediate corrective action through improved lubrication. Accelerating wear and inter strand nicking can indicate a need to reline sheaves to stop further degradation. Careful inspections can monitor the development of local damage at the crossover points of the rope on a winch drum. This way, the operator can determine an optimum time for repositioning the rope on the drum, in order to evenly distribute fatigue loads.

The following are examples of preventative operation and maintenance procedures that could be implemented by using a well designed rope monitoring program (RMP): For offshore cranes equipped with a heave compensation unit. The heave compensation system can quickly reduce the lifetime of the wire rope due to the large number of bending (fatigue) cycles over a short length of wire rope. An RMP could monitor the status of the rope and give a warning when its condition is no longer acceptable. Or an RMP could detect that a certain length of wire rope is almost worn out, and that the wire rope should be repositioned so that the almost worn out length is not subject to heave compensation. For conventional drilling rigs equipped with one hoist winch a 'cut and slip' practice can be used. Here, a large amount of spare wire rope can be stored on the drum. After a certain ton-mileage, the used section of wire rope is cut off, and a new unused wire rope section is slipped through the reeving. Other drilling rigs contain dual winch systems. Here, the travelling block is driven by two draw works at both ends of the wire rope. This is a fast, reliable and redundant drive system. By slowly spooling the wire rope from one drum to the other, the bend fatigue load is spread over the complete wire rope length.

Presently, it is a very conservative practice to replace the wire rope every year. However, an RMP could allow much longer intervals between rope replacements. Furthermore, if the condition of the wire rope is monitored by an RMP, its exchange can be planned in a timely fashion. An RMP will assess rope health and required safety margins on a continuous basis. This will allow optimum operation over the serviceable life of the rope. Another benefit of an RMP is to detect unexpected damage or corrosion. Then limits could be set within which all rope measurements must remain to ensure safe usage. Exceeding these limits would trigger an alarm that is distributed to responsible personnel for appropriate action.

Present length measurement systems measure distance incrementally and indirectly. For example, FIG. 2 shows schematically an incremental distance measurement system, which measures distance along a wire rope by counting the revolutions of an incremental rotary encoder 20 that is driven from a wire rope sheave (e.g., deflection sheave 178) or from a contact wheel 26. However, incremental measurements by distance counter wheels or sheaves are subject to systematic and cumulative errors, and they may not be repeatable. These deviations can be caused by a slightly oversized or undersized distance counter wheels or sheaves, slippage or other causes. The above incremental measurement method, using distance counter wheels, is presently the only known approach.

SUMMARY OF INVENTION

In connection with accurate wire rope nondestructive examination (NDE) methods, exact and absolute distance measurements along the length of a rope become important. Precise distance measurements allow an accurate correlation between the local rope condition and its location along the rope. Given wire rope lengths in excess of, say, 3000 meters, this will require extremely accurate and reliable length/speed measurements. For example, exact distance information is required to reliably compare test results from consecutive inspections over the entire service life of a rope and to make safe and economical rope retirement decisions. Absolute distance measurements also are required to set up rope operating procedures that avoid subjecting certain sections of a rope to excessive bending fatigue cycles that could occur, for example, during AHC operation.

Absolute measurements could be implemented, for example, by attaching markers along the length of the rope, a direct approach and a rather straightforward concept. These indicators can then be used for distance measurements and for identifying certain positions along the rope. It is conceivable for wire rope manufacturers to attach markers, visual or magnetic, at certain predetermined distances (say 100 m or 1 km) on or in the rope. These markers could then be used for absolute distance measurements by refining and calibrating the incremental measurements from a distance counter wheel by this absolute information.

However, manufacturers may not accede to attaching markers during production of wire ropes. Accordingly, other aspects and embodiments of the invention are briefly described as follows.

Certain embodiments implement a method for measuring distance along a wire rope, by steps that include moving the wire rope across a sensor head; counting rotations of a rotary encoder driven by the moving wire rope; detecting a first distance marker crossing the sensor head at a first position of the wire rope; detecting a second distance marker crossing the sensor head at a second position of the wire rope; and establishing calibration parameters for producing a calibrated distance measurement corresponding to any output of the rotary encoder, based at least on correlating a known distance between the first and second distance markers to a counted number of pulses of the rotary encoder between the first and second positions of the wire rope.

Other embodiments provide apparatus for measuring distance along a wire rope that travels along a measurement path. The apparatus comprises a first sensor head; an incremental rotary encoder that is spaced apart from the first sensor head to define the measurement path, and is disposed to contact a wire rope moving along the measurement path; and a distance calibrator that is configured to count pulses of the incremental rotary encoder as the wire rope moves along the measurement path, to detect a first distance marker via the first sensor head at a first position of the wire rope along the measurement path, to detect a second distance marker via the first sensor head at a second position of the wire rope along the measurement path, and to establish calibration parameters that correlate the counted pulses between the first and second positions of the wire rope to a known distance between the first and second distance markers.

Other embodiments provide apparatus for measuring distance along a wire rope that travels a measurement path. The apparatus comprises first and second magnetic homogenizer/sensor heads disposed along and defining the measurement path; an incremental rotary encoder disposed to contact a wire rope that travels along the measurement path; a first magnetic homogenizer/sensor head disposed at a first side of the first and second magnetic homogenizer/sensor heads along the measurement path; a second magnetic homogenizer/sensor head disposed at a second side of the first and second magnetic homogenizer/sensor heads along the measurement path; first and second magnetizing coils disposed between the first and second sensor heads and spaced apart by a known distance along the measurement path; and a distance calibrator. The distance calibrator is configured to count pulses of the incremental rotary encoder as the wire rope moves along the measurement path, to energize the first and second magnetizing coils for inducing respective first and second magnetic markers at an initial position of the wire rope, to detect the first magnetic marker via one of the first or second magnetic sensor heads at a first position of the wire rope, to detect the second magnetic marker via the same one of the first or second homogenizer/magnetic sensor heads at a second position of the wire rope, and to establish calibration parameters that correlate the counted rotations to a known distance between the first and second magnetic markers. In such embodiments the sensor heads of conventional magnetic NDE apparatus simultaneously act as homogenizers to set up the wire rope for the magnetizing coils to provide magnetic distance markers.

The varied exemplary embodiments of the invention, as briefly described above, are illustrated by certain of the following figures.

BRIEF DESCRIPTION OF DRAWINGS

FIG. 3 shows a functional block diagram of a distance calibration apparatus, according to the invention.

FIG. 4 shows schematically a method for calibrating an incremental rope distance signal, according to the invention.

DETAILED DESCRIPTION

Figure 1:
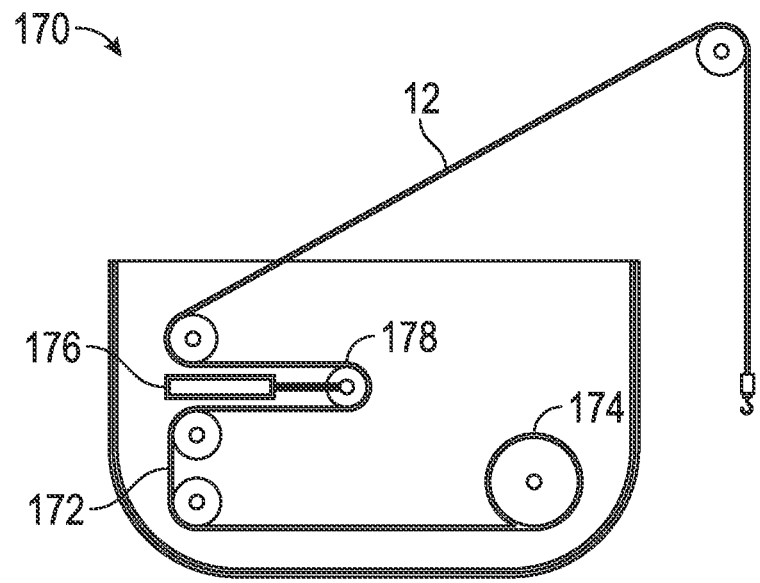
FIG. 1 shows schematically an active heave compensation system, according to prior art.
Figure 2:
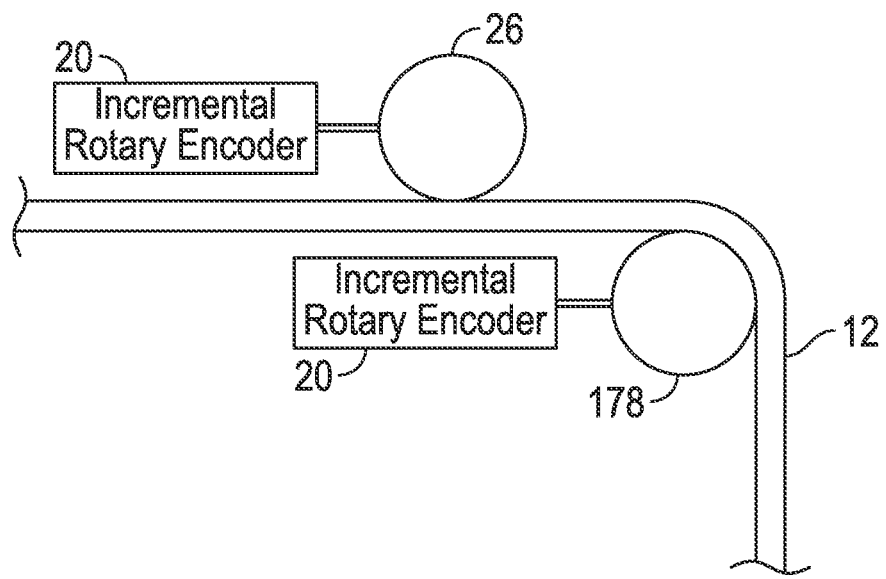
FIG. 2 shows schematically an incremental distance measurement system, according to prior art.

Although embodiments of the invention are shown in the drawings and are described as relating to distance measurements along high-value wire ropes, aspects of the invention more generally may be applicable to distance measurements along any sort of cable.

FIG. 3 shows a functional block diagram of a distance calibration apparatus 10, according to a first embodiment of the invention. The inventive apparatus 10 is configured for use with a wire rope 12. According to a typical embodiment, the wire rope 12 carries at least two distance markers 14, which are spaced apart at a well defined known distance, D. The distance markers 14 can be permanently attached to the wire rope 12, however, permanent attachment is not essential to the invention. The wire rope 12 is positioned adjacent an Incremental Rotary Encoder 20 and a sensor head 30, which are components of the apparatus 10 that define a measurement path for the wire rope 12. The incremental rotary encoder 20 produces an Incremental Rope Distance Signal 22 (e.g., a sequence of pulses 24 as shown in FIG. 4, each pulse corresponding to a full or partial rotation of a rotary encoder wheel 26) that is subject to inaccuracies as described above. The sensor head 30 can be a magnetic sensor head, for example of a type as conventionally used for magnetic non-destructive examination ("NDE"). The sensor head 30 continuously produces an NDE signal 32, e.g., a magnetic inspection signal that is used for the detection and evaluation of rope deterioration. In order to calibrate the incremental rotary encoder 20 for reduction of inaccuracies, the apparatus 10 also includes a distance calibrator 40 that is operatively connected to the incremental rotary encoder 20 (for sensing the incremental rope distance signal 22) and to the sensor head 30 (for sensing the inspection signal 32, including indications 52 of the distance markers 14).

FIGS. 3-4 show schematically a method 50 for calibrating the incremental rope distance signal 22. In certain embodiments, the distance calibration apparatus 10 implements the method 50. As one step of the method 50, the distance calibrator 40 continuously senses the inspection signal 32 that is output from the sensor head 30, which detects 52 the distance markers 14 as they move through the sensor head 30. As another step 54 of the method 50, the distance calibrator 40 counts pulses 24 of the incremental rope distance signal 22 of the incremental rotary encoder 20. The distance calibrator 40 then calculates 56 a length of wire rope, d between each of the incremental pulses 24, d=D/N based on a number, N, of incremental pulses counted between distance marker detections 52. In case the leading edges of the distance marker detections 52 and of the incremental pulses 24 coincide, as shown in FIG. 4, then the distance between pulses d=D/N exactly, as indicated in FIG. 4. However, in case the leading edges of distance marker detections 52 do not coincide with the leading edges of incremental pulses 24, then d can be interpolated. In this case, it can be assumed that the wire rope 12 moves at constant speed between successive incremental pulses 24. Then, distance ratios are equivalent to time ratios between pulses. This equivalence can be used for interpolation.

By calculating a value for d, the distance calibrator 40 has established calibration parameters by which the distance calibration and measurement apparatus 10 can produce a calibrated distance measurement corresponding to any value of the incremental rope distance signal 22.

Various types of distance markers 14 can be utilized. For example, it is possible according to certain embodiments of the invention to attach absolute visual markers 14, such as paint or plastic strips that are spaced apart at known distances along the wire rope 12, in which case an optical sensor head 30 could be used. Commercially available wear-resistant paints and tapes would be suitable. Plastic markers 14—for example made from UHMWPE—also could be molded onto the wire rope 12. These indicators could be optically detected by a simple machine vision system and used for absolute distance measurements. On the other hand, visual markers could become covered with grease and not be detectable, or they could wear off.

Therefore, according to other embodiments of the invention, magnetic absolute distance markers 14 can be used. One advantage of magnetic markers is that they are not affected by grease and dirt on the rope surface. Therefore, this approach promises to be robust and reliable.

Figure 5:
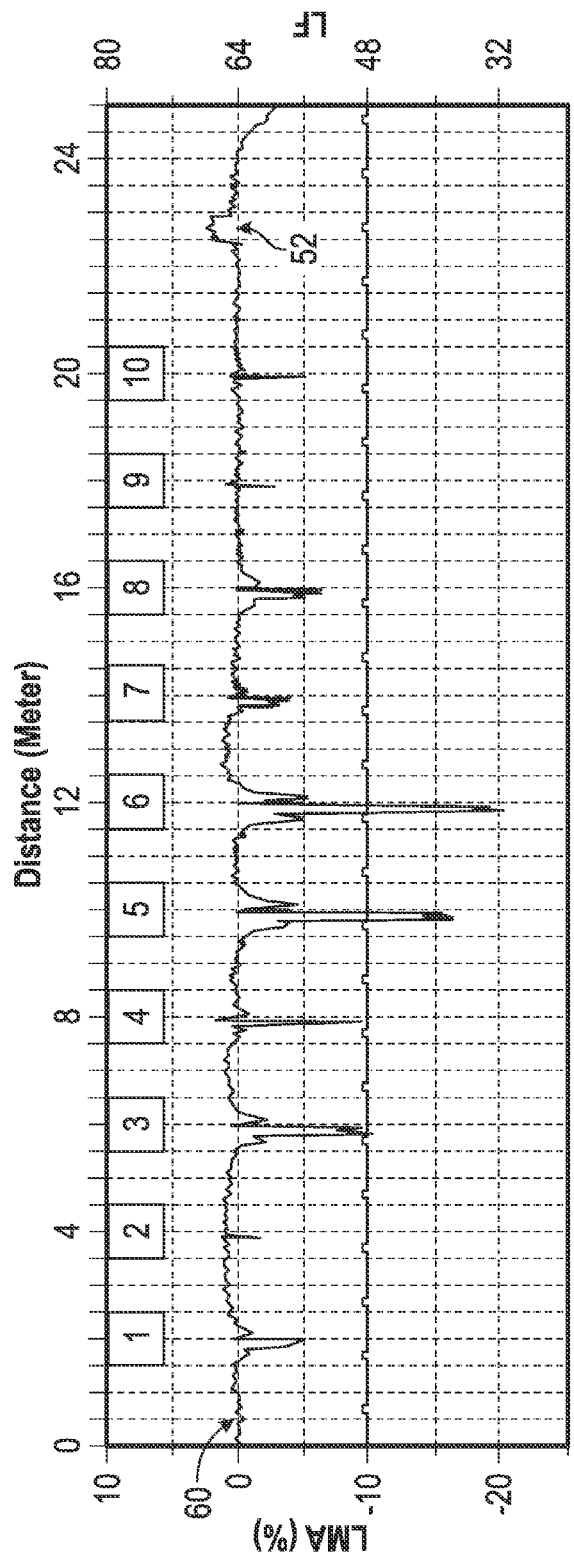
FIGS. 5-7 illustrate exemplary loss of metallic cross-sectional area ("LMA") traces, each of which includes a test wire detection, according to the invention.
Figure 6:
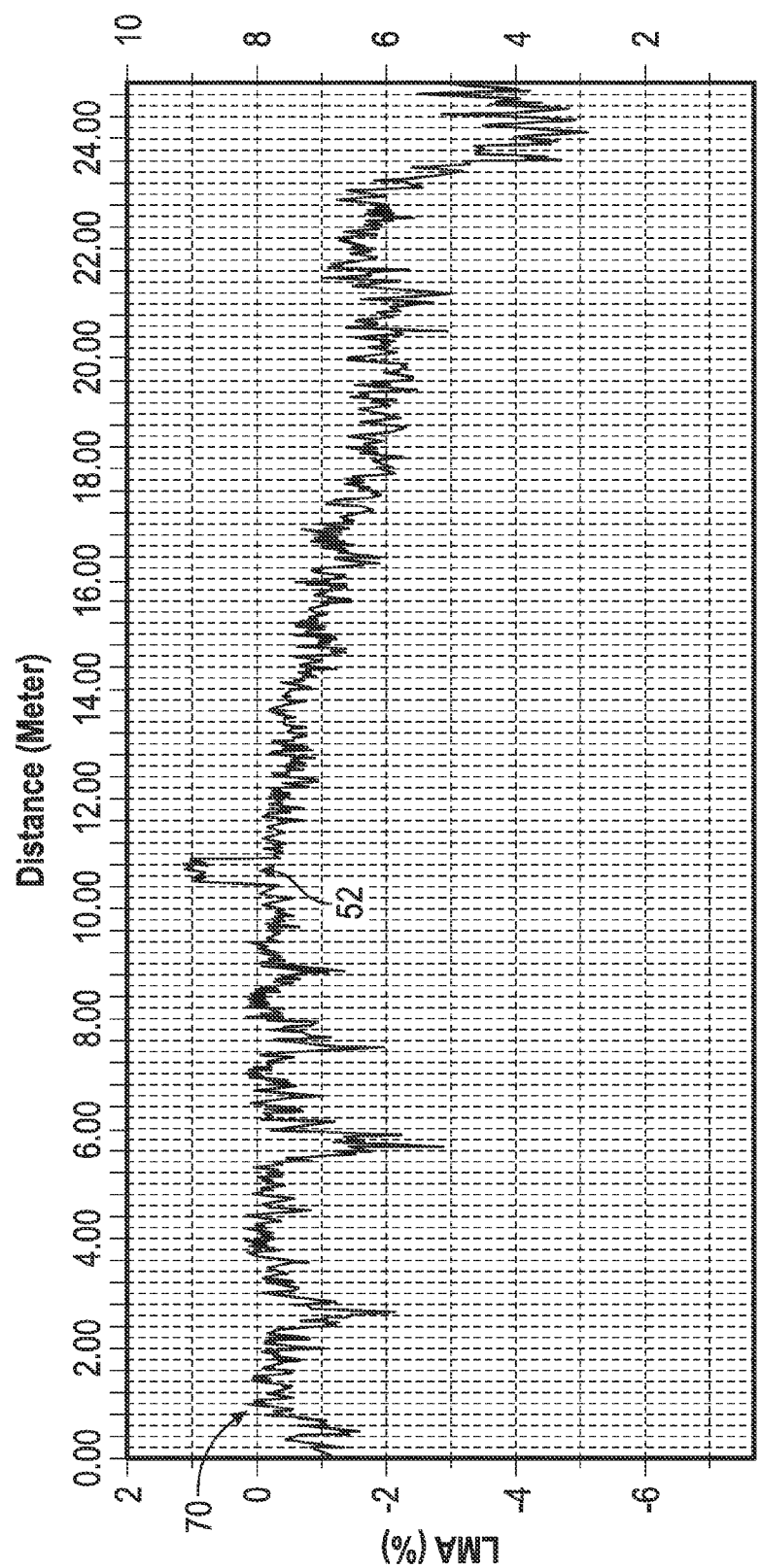
Figure 7:
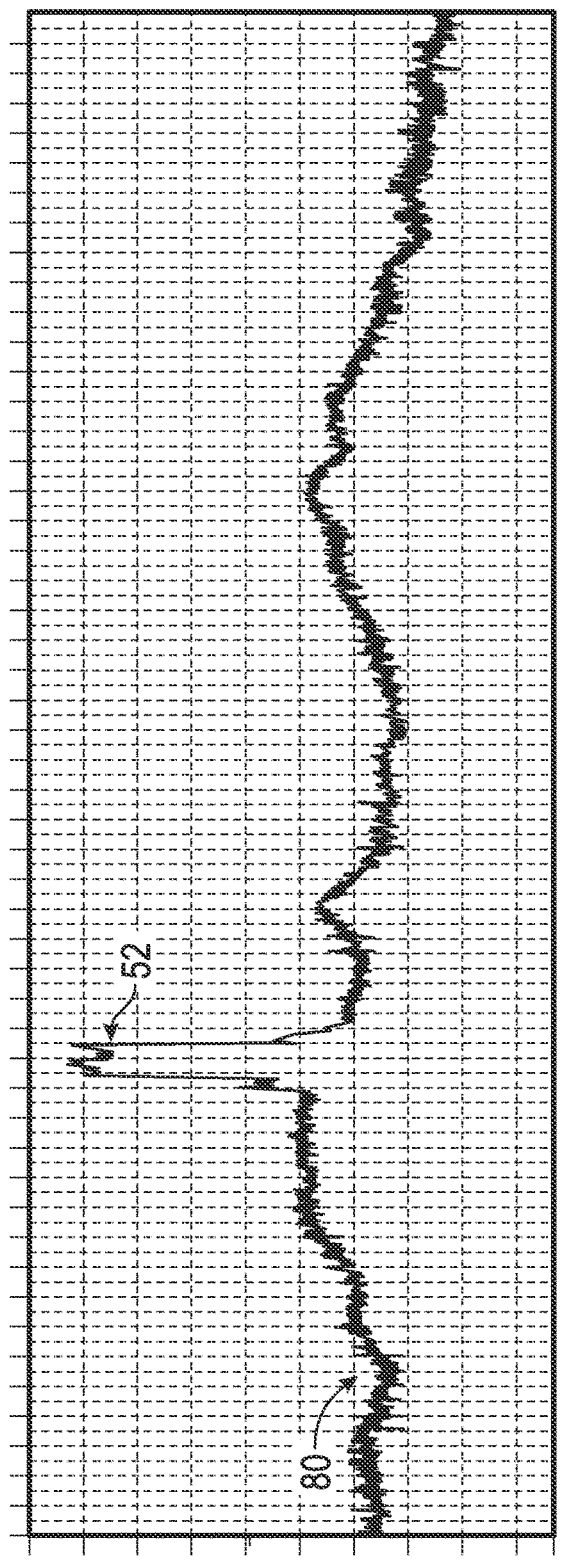

For example, a "test wire" 14 can be utilized for in-service in situ calibration of an LMA (loss of metallic cross-sectional area) signal trace (as produced by a magnetic NDE sensor head) to establish a certain position along the length of a wire rope 12 as a reference for correlation with the LMA trace. FIGS. 5-7 illustrate by way of examples LMA traces (test wire signals) 60, 70, 80, each of which includes test wire detection 52.

Essentially, this technique uses test wires that are permanently or temporarily attached to the wire rope 12 for inspection. Besides serving as a rope cross-section reference, the test wire also establishes a distance marker 14 along the length of the rope. This helps to locate the positions of anomalies along the rope and to correlate them with corresponding indications on the chart recording.

It is conceivable for wire rope manufacturers to embed test wires (or other steel objects) at certain predetermined distances (say 100 m or 1 km) in the rope. These markers could then be used for absolute distance measurements. The incremental measurements from a distance counter wheel could then be refined and calibrated by this absolute information.

Of course, the above method may be problematic and/or not accepted by wire rope manufacturers and users. Nevertheless, test wires could be temporarily attached and used to more accurately calibrate the readings from an incremental distance counter wheel. They could be removed after the calibration. This method may be adequate.

Alternatively, instead of using test wires, plastic magnetic distance markers 14—for example made from UHMWPE and filled with iron filings—could be molded onto the wire rope 12. Furthermore, wear resistant paints could be filled with iron filings and applied to the rope as markers.

As another option, for plastic filled wire ropes, short sections of the intermediate plastic layer can be filled with iron filings in order to establish certain distance markers 14 at desired distances along the length of the rope.

Such distance markers 14, as described above, could be magnetically detected with present NDE equipment (for example, equipment used in LMA rope inspection as disclosed in U.S. Pat. No. 4,659,991 or U.S. Pat. No. 8,386, 395) and used for absolute distance measurements. In other words, present wire rope equipment with LMA capabilities could be used as magnetic sensor heads 30. LF-type signals from wire rope test equipment also could be used, but would be more difficult to interpret. Under certain conditions, the distance markers 14 simultaneously could be used for relative in-situ calibration of the LMA signal during magnetic inspections of the rope.

For densely-packed compacted multistrand ropes, space between wires and strands is kept to a minimum. Hence, attaching or embedding magnetic or visual markers to or into the rope may not be feasible. In this case, wear patterns as detected and recorded by wire rope NDE along the rope can be used as distance markers as follows.

Over its lifetime, but long before retirement, a wire rope 12 will develop distinctive wear patterns along its length that can be detected and recorded by a magnetic NDE system. Furthermore, as will be discussed in the following, distance measurements can be combined with wire rope NDE.

Figure 8:
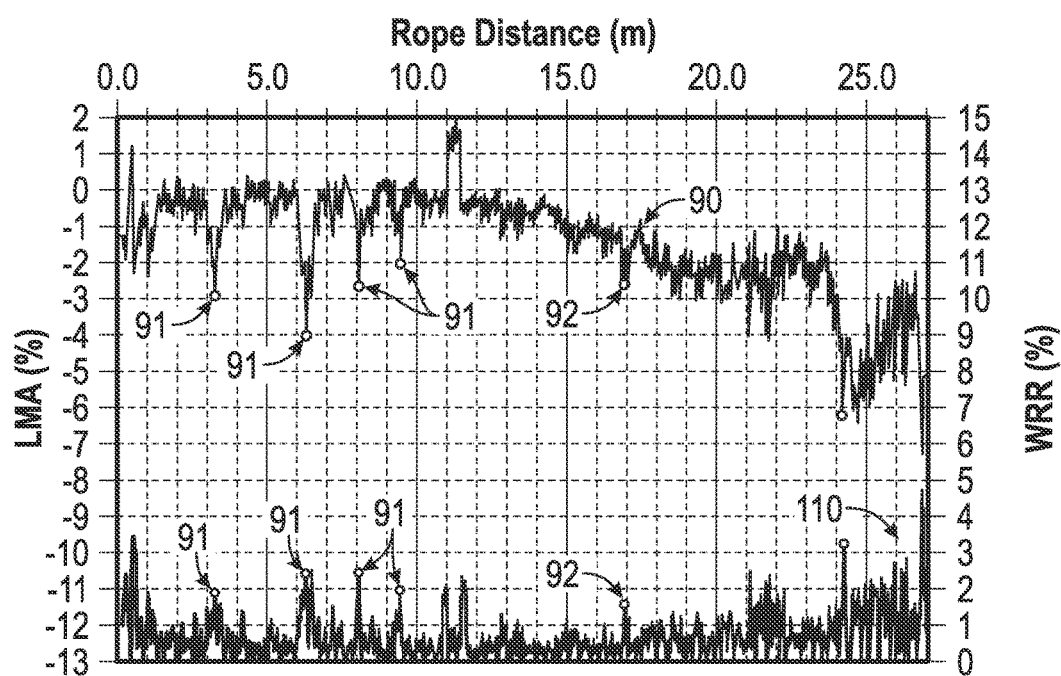
FIGS. 8-9 illustrate magnetic non-destructive examination ("NDE") test signals that include characteristic patterns of rope deterioration.
Figure 9:
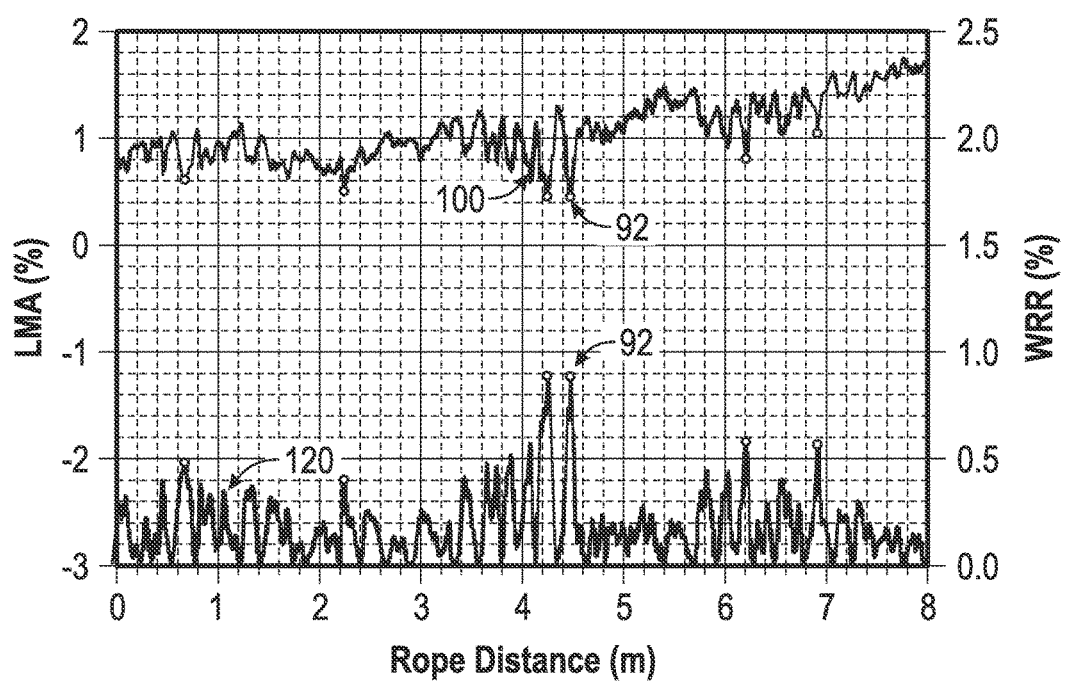

FIGS. 8-9 illustrate magnetic NDE test signals 90, 100 that include characteristic patterns of rope damage ("winding on drum damage" 91 as well as "deterioration markers" 92). The deterioration markers 92 can be used as distance markers 14 along the length of a wire rope 12. For example, rope damage in certain positions can be caused by winding the rope on a drum. Especially, points where the rope is squeezed between the drum flange and the previous wrap— as the rope crosses over from layer to layer on a drum, and as it rises to form the next layer—produce regions of accelerated wear. FIG. 8 illustrates an LMA trace 90, which includes deterioration markers 92 that are characteristic of winding-on-drum damage. By comparison, FIG. 9 illustrates an LMA trace 100, which includes deterioration markers 92 that are characteristic of broken wires or clusters of broken wires (external and internal) and/or interstrand nicking. While not caused by loss of metallic cross-sectional area (LMA) per se, these indications are caused by slight dislocations of material. Furthermore, once rope damage is initiated in a certain position, it will increase exponentially with the number of load cycles. Therefore, the amplitude of these distance indications will increase over time while their position along the rope will not substantially change. Thus, according to certain embodiments of the invention, the deterioration markers 92 can be utilized as absolute distance markers 14.

Besides the LMA signal, so-called Wire Rope Roughness (WRR) signals 110 or 120, as shown in FIGS. 8-9, can be particularly useful for finding suitable Deterioration Markers 92. U.S. PG Pub. 2013/0147471 A1 explains a method for extracting WRR from an LMA trace.

Figure 10:
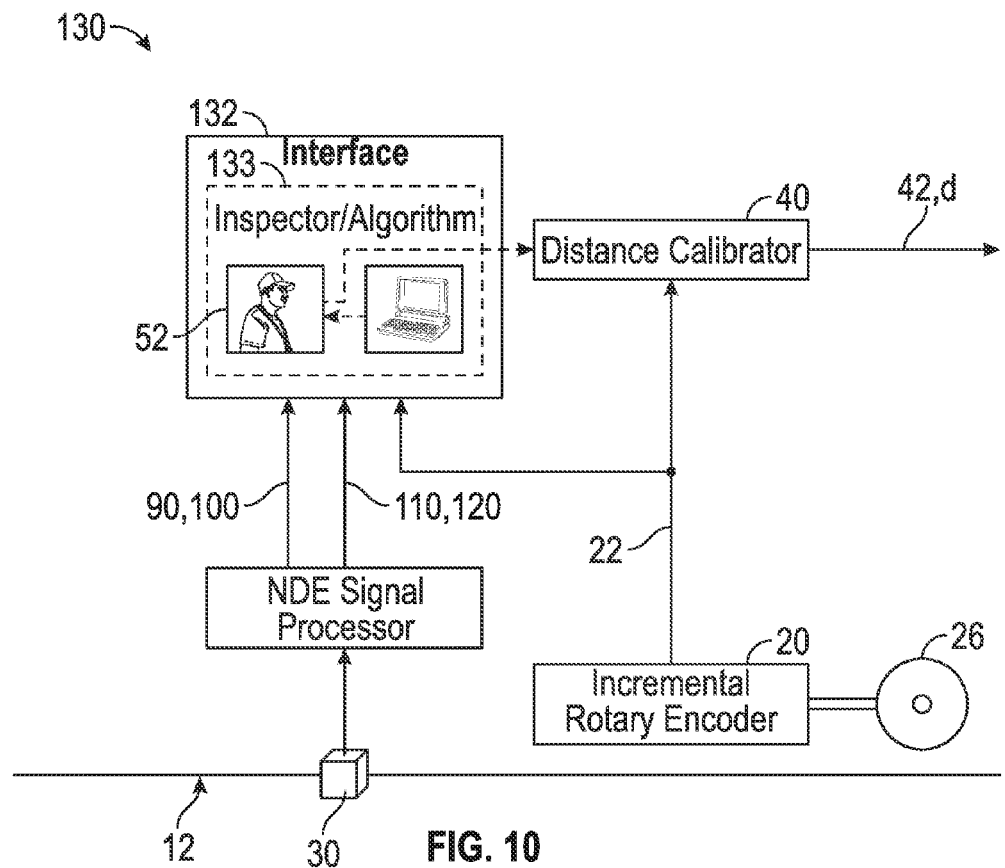
FIG. 10 shows a functional block diagram of a (relative) quasi absolute calibration method, according to the invention.

FIG. 10 shows a functional block diagram of a (relative) quasi absolute calibration method 130. (Relative) calibration is performed as follows. As rope deterioration develops, as illustrated by FIGS. 8 and 9, it produces characteristic patterns or deterioration markers 92 in magnetic NDE test signals, especially in the LMA signals 90, 100 and in the WRR signals 110, 120. The deterioration markers 92 include well-defined local (relative) peaks and valleys (extrema) of the LMA and WRR signals. At a magnetic NDE system interface 132, an inspector or NDE technician (operator), or a peak detect algorithm 133, detects 52 two or more characteristic deterioration markers 92. The distance calibrator 40 receives the detections 52 of the deterioration markers 92 along with, possibly, an operator's measurement of the distance D therebetween. The distance calibrator 40 then calibrates 50 the incremental distance signal 22, according to d=D/N exactly or by interpolation, as discussed above with reference to FIG. 4.

As discussed above, it can be assumed that the distance D between deterioration markers 92 will not change. This also can be verified by an inspector. However, a number of incremental pulses 24 between deterioration markers 92 can change between calibrations because, for example, a diameter of the incremental rotary encoder wheel 26 can change between inspections.

Since an absolute metric distance (e.g., in meters or yards) between deterioration markers 92 is unknown a priori, the absolute metric distance between incremental pulses also cannot be known a priori, and it only is possible to determine relative distances in terms of "pulses between deterioration markers." For example, if a distance between deterioration markers 92 is defined as "one unit of length," then any distance along the rope can be measured in "units of length." The determination of absolute distances between pulses (say, in mm) or of the absolute length (in meter or yards, for example) of a "unit of length" as defined above is discussed in the following.

In case neither visual nor magnetic absolute distance markers at well-defined distances are practical, absolute or quasi-absolute distance measurements (e.g., in meters) may not be possible, and alternative methods for improving the measurement accuracy of incremental encoders must be investigated. The same is true if Deterioration Markers 92 are not available. As previously mentioned, incremental measurements by distance counter wheels 26 or sheaves are subject to systematic and cumulative errors, and they may not be repeatable. These deviations can be caused by a slightly oversized or undersized distance counter wheels or sheaves due to wear or other causes. Errors can also be introduced by slippage etc.

Figure 11:
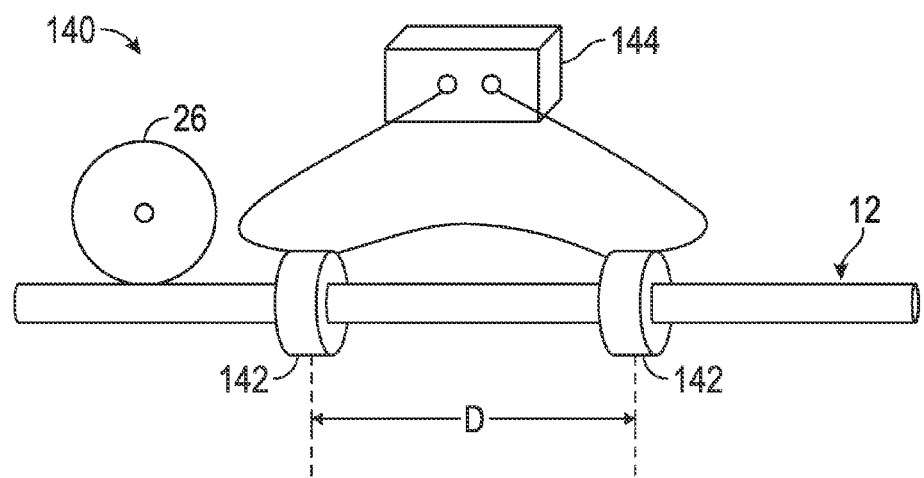
FIG. 11 shows select components of a quasi-continuous distance calibration apparatus, according to the invention.

Accordingly, FIG. 11 shows select components of a quasi-continuous distance calibration apparatus 140. The distance calibration apparatus 140 is configured to implement a reference distance measurement and calibration method 150 (shown in FIG. 12) for improving accuracy of incremental distance measurements by in-situ, and more or less continuous, re-calibration of the incremental distance measurement system (rotary encoder 20) against a well-defined reference distance D that is established along the length of the wire rope 12. For the purpose of establishing the reference distance D, the distance calibration apparatus 140 includes at least two magnetizer coils 142 that are spaced apart at the distance D along the length of the wire rope 12. The coils 142 are excited by one or more magnetizing current pulses, and permanently magnetize two short sections of the (steel) wire rope 12 in order to establish two magnetic markers 14 that are separated by the well-defined distance D. The magnetizing current pulses can be produced by a pulse magnetizer 144, for example an MC Magnetizer from MAGSYS Magnet Systeme.

Preferably, the two magnetic markers 14 should have identical shapes on the rope. For a completely homogeneous wire rope 12, this can be achieved by providing identical magnetizing currents in both coils 142. This, in turn, can be realized by connecting both magnetizer coils in series.

Figure 12:
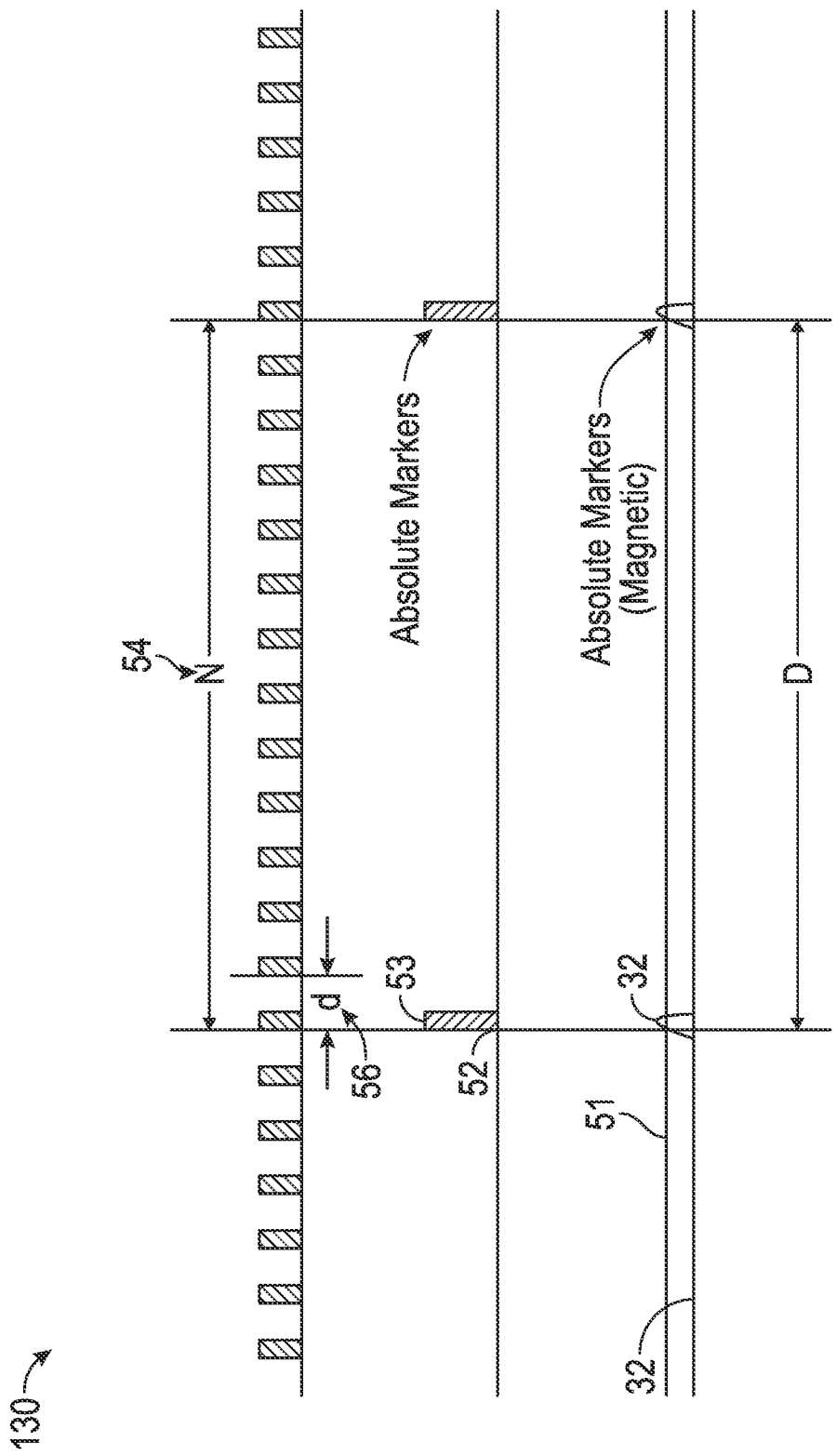
FIG. 12 shows select steps of a calibration method to be implemented by the calibration apparatus of FIG. 11.

FIG. 12 shows select steps of the calibration method 150 to be implemented by the distance calibration apparatus 140 of FIG. 11. The position of each reference distance marker 14 is established by triggering 52 a digital pulse 53 when the magnetic reference distance signal 32 crosses some trigger level 51. For calibration, the distance calibration apparatus 140 counts 54 the number of incremental pulses N between the reference markers 14. In case the leading edges of the reference and incremental markers coincide, the apparatus 140 calculates 56 a distance d between markers d=D/N, as indicated in FIG. 12. In case the leading edges do not coincide, interpolation can be used. In this case, it can be assumed that the rope 12 moves at constant or predictably varying speed between successive incremental signal pulses. Then, distance ratios are equivalent to time ratios between pulses. This equivalence can be used for interpolation.

Figure 13:
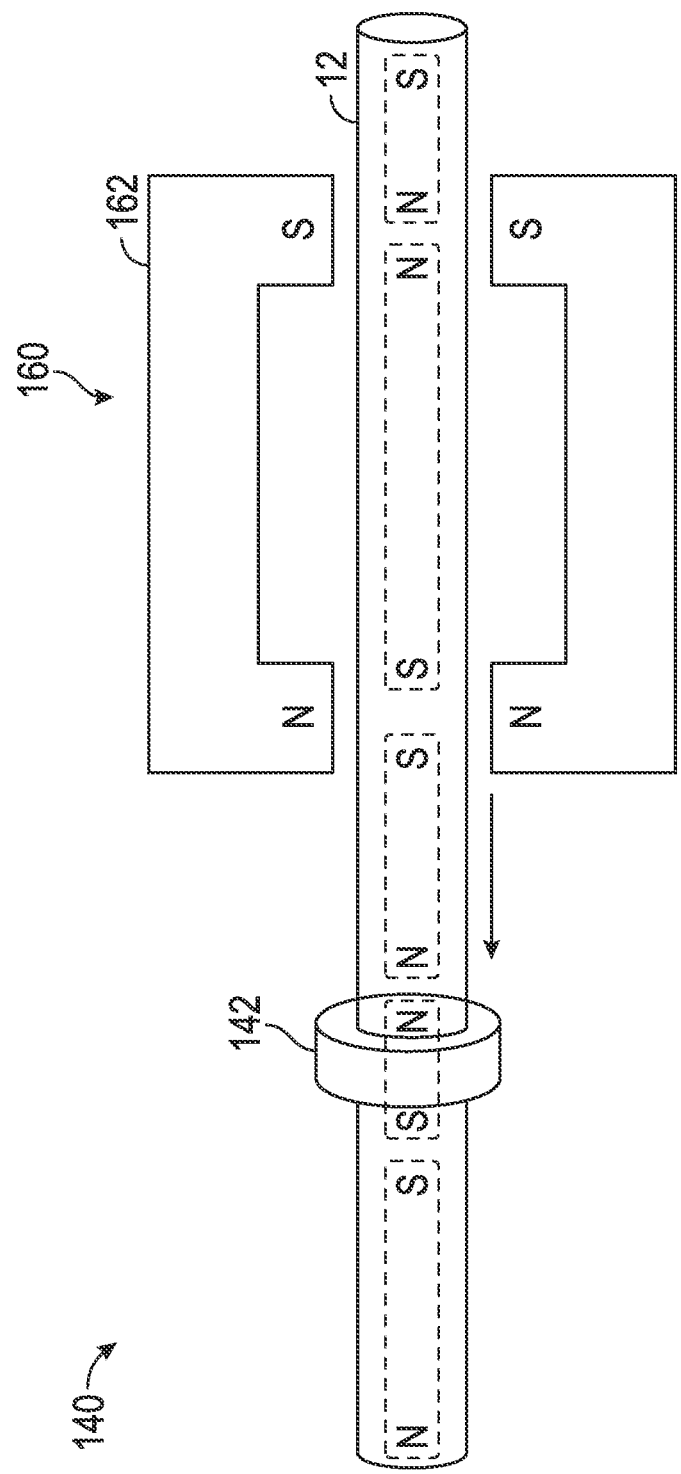
FIG. 13 shows additional components of the quasi-continuous distance calibration apparatus of FIG. 11.

The above described reference distance measurement and calibration method 150 might get distorted by spurious permanent magnetization along the length of the rope. Typically, spurious magnetization is caused by prior nondestructive magnetic examinations (NDE). Random magnetization can be overridden by uniformly and permanently magnetizing the rope over its entire length. For example, FIG. 13 shows additional components of the distance calibration apparatus 140 of FIG. 11. In particular, FIG. 13 shows a magnetic NDE system 160 that is disposed to homogeneously magnetize 152 the wire rope 12 prior to the rope moving past one of the magnetizer coils 142 of the distance calibration apparatus 140. In particular, the wire rope 12, simply by moving through a magnetic sensor head 162 of the magnetic NDE system 160, obtains permanent and uniform magnetic homogenization. After uniform magnetic homogenization, the magnetizer coil 142 can alter 154 the permanent magnetization over short sections of the wire rope 12 in order to establish magnetic markers 14 at spaced positions along the length of the rope 12. Permanent magnetization can be altered by reverse magnetization (shown in FIG. 13), or by partial or entire demagnetization.

Figure 14:
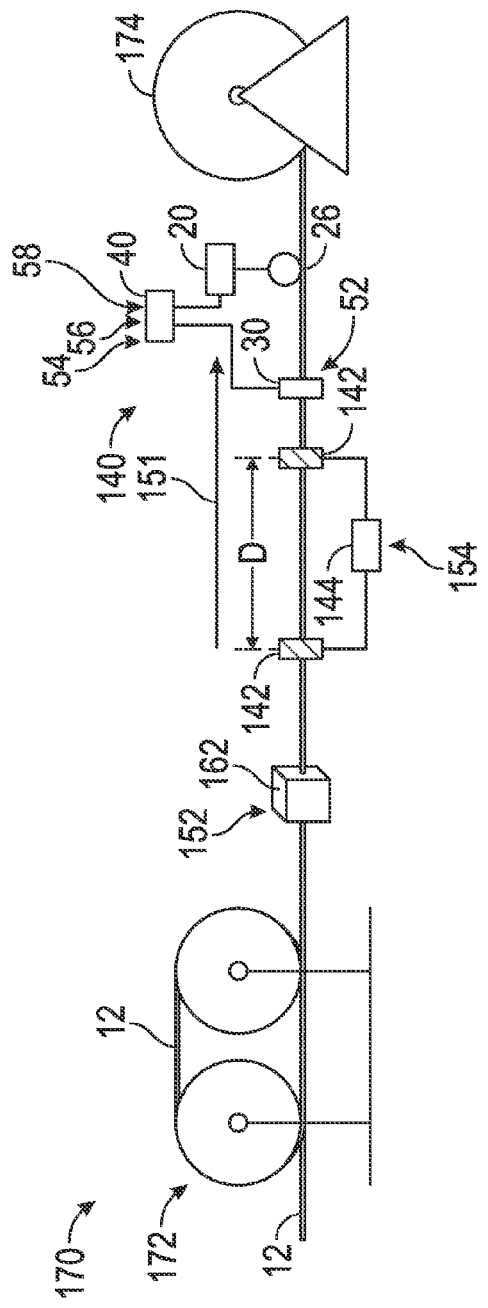
FIG. 14 shows the entire distance calibration apparatus of FIG. 11, installed in a traction winch AHC system for unidirectional operation, according to the invention.

Referring now to FIG. 14, the entire distance calibration apparatus 140 is shown installed in a traction/storage winch system 170. In particular, the distance calibration apparatus 140 is installed at a length of the wire rope 12 that is between a traction winch 172 and a storage winch 174. Typically, the position and tension of the wire rope 12 will be well controlled along the length between the traction winch and the storage winch and below the storage winch. Thus, this length of the wire rope 12 is ideally set up for reference distance measurement. Therefore, the quasi-continuous distance calibration apparatus 140 (or the distance calibration apparatus 10) could be positioned in front of the traction winch and after and below the storage winch.

Still referring to FIG. 14, the reference-distance measurement and incremental-encoder (absolute) calibration method 150 comprises the following sequential steps. First, as the wire rope 12 is wound 151 onto the storage winch 174, magnetic homogenization 152 is implemented by a magnetic homogenizer, e.g., the sensor head 162 of the magnetic wire rope NDE system 160. Next, two magnetic markers 14 are established 154 at a well defined distance, D, along the rope. This can be accomplished by the magnetizer coil(s) 142 re-magnetizing the wire rope 12, as described above with reference to FIG. 13. Then, the distance calibrator 40 detects 52 the magnetic markers 14 in the magnetic reference signal 32 that is provided from the sensor head 30. The distance calibrator 40 also counts 54 pulses 24 of the incremental rope distance signal 22 that is provided from the Incremental Rotary Encoder 20, and calculates 56 the distance d that the wire rope 12 has moved between each of the pulses 24. The distance calibrator 40 then continuously processes 58 the incremental rope distance signal 22 in order to provide a calibrated distance measurement 42. From time to time, the method 150 can be repeated to re-calibrate the apparatus 140.

Figure 15:
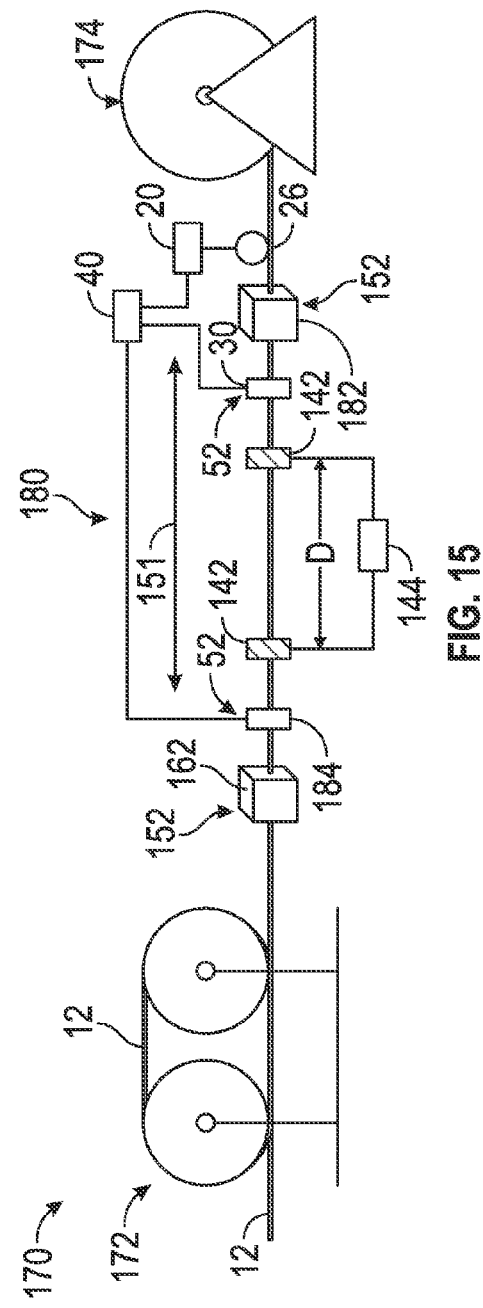
FIG. 15 shows a bi-directional distance calibration apparatus that duplicates certain elements of the apparatus of FIG. 14, according to the invention.

The setup of FIG. 14, with the sensor head 30 between the magnetizing coils 142 and the storage winch 174, implies that the above reference distance measurement and calibration method 150 is unidirectional, i.e. works only as the wire rope 12 is wound 151 onto the storage winch 174. For bidirectional operation, FIG. 15 shows a bi-directional distance calibration apparatus 180 that duplicates certain elements of the apparatus 140 of FIG. 14. In particular, the apparatus 180 includes a second NDE head (magnetic homogenizer) 182, disposed between the storage winch 174 and the sensor head 30. The apparatus 180 also includes a second sensor head 184, disposed between the magnetic homogenizer 162 and the magnetizing coils 142. In case the method 150 is to be performed while the wire rope 12 is being deployed 151 from the storage winch, then the second magnetic homogenizer 182 homogenizes 152 the wire rope 12, the magnetizing coils 142 establish 154 the magnetic markers 14, and the second sensor head 184 provides the magnetic reference signal 32. Alternatively, the first sensor head 30 may be operated as the magnetic homogenizer 182 while the wire rope 12 travels from the first sensor head toward the second sensor head 184; and the second sensor head may be operated as the magnetic homogenizer 162 while the wire rope travels from the second sensor head toward the first sensor head.

Thus, quasi absolute rope length measuring can be implemented by using the above described Absolute Calibration Method (ACM) 150 together with the (Relative) Absolute Calibration Method (RACM) 130. This can be done in two steps as follows. During the first part of its service life a rope will show no deterioration. Therefore, no deterioration markers will be available, and the RACM 130 cannot be used. The above described ACM 150 can be used to substantially increase the accuracy of incremental distance measurements. As soon as the first deterioration markers can be identified the RACM 130 can be used. The results of the RACM can be updated with the ACM 150.

Although exemplary embodiments of the invention have been described with reference to attached drawings, those skilled in the art nevertheless will apprehend variations in form or detail that are consistent with the scope of the invention as defined by the appended claims. As one example, with reference to FIGS. 14 and 15, further research could be directed to implementing the inventive method using only one magnetizing coil that is set at a known distance from each sensor head along the measurement path.

What is claimed is:

1. A method for measuring distance along a wire rope, said method comprising:
   moving the wire rope across a sensor head;
   counting pulses of a rotary encoder driven by the moving wire rope;
   detecting a first distance marker crossing the sensor head at a first position of the wire rope;
   detecting a second distance marker crossing the sensor head at a second position of the wire rope; and
   establishing calibration parameters for producing a calibrated distance measurement corresponding to an output of the rotary encoder, based at least on correlating a known distance between the first and second distance markers to a counted number of pulses of the rotary encoder between the first and second positions of the wire rope.

2. The method of claim 1, wherein the first and second distance markers are established at an initial position of the wire rope.

3. The method of claim 1, further comprising establishing at least the first distance marker by operation of a magnetizer coil that is disposed at a known distance from the sensor head.

4. The method of claim 1, further comprising simultaneously establishing the first and second distance markers at a known distance from each other along the wire rope.

5. The method of claim 4, wherein the first and second distance markers are established by homogeneously magnetizing the wire rope, and then altering magnetization at the first and second distance markers.

6. The method of claim 4, wherein the first and second distance markers are established simultaneously by a pair of magnetizer coils disposed at a known distance from each other.

7. The method of claim 1, further comprising sequentially establishing the first and second distance markers by operation of at least one magnetizer coil disposed at a known distance or distances from the sensor head.

8. The method of claim 1, wherein at least one of the first or second distance markers comprises ferromagnetic material fastened to the wire rope.

9. The method of claim 8, wherein the ferromagnetic material is a test wire fastened to the wire rope.

10. The method of claim 1, wherein the first and second distance markers are established as characteristic patterns in a magnetic NDE test signal obtained by operation of the sensor head.

11. The method of claim 1, wherein the first distance marker is detected at a position on the wire rope between a traction winch and a storage winch.

12. An apparatus for measuring distance along a wire rope that travels along a measurement path, said apparatus comprising:
a first sensor head;
an incremental rotary encoder that is spaced apart from the first sensor head to define the measurement path, and is disposed to contact a wire rope moving along the measurement path; and
a distance calibrator that is configured to count rotations of the incremental rotary encoder as the wire rope moves along the measurement path, to detect a first distance marker via the first sensor head at a first position of the wire rope along the measurement path, to detect a second distance marker via the first sensor head at a second position of the wire rope along the measurement path, and to establish calibration parameters that correlate the counted rotary encoder pulses between the first and second positions of the wire rope to a known distance between the first and second distance markers.

13. The apparatus of claim 12, wherein the distance calibrator is further configured to produce a distance signal based on the calibration parameters and on the pulses of the incremental rotary encoder.

14. The apparatus of claim 12, wherein the distance calibrator is configured to detect at least one of the first and second distance markers as a characteristic pattern of a magnetic NDE waveform.

15. The apparatus of claim 14, wherein the distance calibrator is configured to receive an operator's measurement of a known distance between the first and second distance markers.

16. The apparatus of claim 12, further comprising a first magnetic homogenizer and at least one magnetizing coil, which is disposed at a known location between the first sensor head and the first magnetic homogenizer, wherein the distance calibrator is further configured to energize at least one magnetizing coil to establish at least one of the first and second distance markers as the wire rope moves from the first magnetic homogenizer toward the first sensor head.

17. The apparatus of claim 16, further comprising a second magnetic homogenizer disposed along the measurement path at an opposite side of the first magnetic sensor head from the first and second magnetizing coils, and a second sensor head disposed between the first magnetic homogenizer and the first and second magnetizing coils.

18. The apparatus of claim 12, further comprising a first magnetic homogenizer and at least first and second magnetizing coils, which are disposed between the first sensor head and the first magnetic homogenizer and are spaced apart from each other by a known distance along the measurement path, wherein the distance calibrator is further configured to energize the first and second magnetizing coils at an initial position of the wire rope to establish first and second distance markers as the wire rope moves along the measurement path from the first magnetic homogenizer toward the first sensor head.

19. An apparatus for measuring distance along a wire rope that travels a measurement path, said apparatus comprising:
first and second magnetic sensor heads disposed along and defining the measurement path;
an incremental rotary encoder disposed to contact a wire rope that travels along the measurement path;
first and second magnetizing coils disposed between the first and second sensor heads and spaced apart by a known distance along the measurement path; and
a distance calibrator that is configured to energize the first and second magnetizing coils for inducing respective first and second magnetic markers at an initial position of the wire rope, to detect the first magnetic marker via one of the first or second magnetic sensor heads at a first position of the wire rope, to detect the second magnetic marker via the same one of the first or second magnetic sensor heads at a second position of the wire rope, to count pulses of the incremental rotary encoder as the wire rope moves from the first position to the second position along the measurement path, and to establish calibration parameters that correlate the counted rotations to a known distance between the first and second magnetic markers.

20. The apparatus of claim 19, wherein the distance calibrator is configured to energize the second sensor head as a magnetic homogenizer and to detect the first and second magnetic markers via the first magnetic sensor head while the wire rope moves in a first direction from the magnetic homogenizer toward the first magnetic sensor head, and is configured to energize the first sensor head as a magnetic homogenizer and to detect the second and second magnetic markers via the second magnetic sensor head while the wire rope moves in a second direction from the magnetic homogenizer toward the second magnetic sensor head.

* * * * *